United States Patent
Stewart, III et al.

(10) Patent No.: US 9,715,363 B2
(45) Date of Patent: Jul. 25, 2017

(54) WEARABLE DEVICE WITH PUBLIC DISPLAY AND PRIVATE DISPLAY AREAS

(71) Applicant: LENOVO (Singapore) PTE, LTD., New Tech Park (SG)

(72) Inventors: Aaron Michael Stewart, III, Raleigh, NC (US); Lance Warren Cassidy, Jr., Raleigh, NC (US); Jeffrey E. Skinner, Raleigh, NC (US); Kirsten Uta Schambra Stevens, Raleigh, NC (US); Jonathan Jen-Wei Yu, Raleigh, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 11 days.

(21) Appl. No.: 14/228,010

(22) Filed: Mar. 27, 2014

(65) Prior Publication Data

US 2015/0277839 A1   Oct. 1, 2015

(51) Int. Cl.
| | |
|---|---|
| *G06F 1/16* | (2006.01) |
| *G06F 3/14* | (2006.01) |
| *G06F 3/01* | (2006.01) |
| *G06F 3/041* | (2006.01) |
| *G06F 3/16* | (2006.01) |
| *G09G 5/14* | (2006.01) |
| *G06F 3/147* | (2006.01) |

(52) U.S. Cl.
CPC ............ *G06F 3/1423* (2013.01); *G06F 1/163* (2013.01); *G06F 1/1647* (2013.01); *G06F 3/017* (2013.01); *G06F 3/0412* (2013.01); *G06F 3/147* (2013.01); *G06F 3/167* (2013.01); *G09G 5/14* (2013.01); *G09G 2354/00* (2013.01); *G09G 2358/00* (2013.01); *G09G 2360/04* (2013.01); *G09G 2380/02* (2013.01)

(58) Field of Classification Search
CPC ....................................................... G06F 1/163
See application file for complete search history.

(56) References Cited

U.S. PATENT DOCUMENTS

| | | | |
|---|---|---|---|
| 7,197,638 B1* | 3/2007 | Grawrock | G06F 21/6218 705/51 |
| 2002/0083025 A1* | 6/2002 | Robarts | G06F 1/163 706/12 |
| 2004/0218036 A1* | 11/2004 | Boss | G06F 21/62 348/14.08 |
| 2006/0034161 A1 | 2/2006 | Muller | |
| 2012/0209839 A1* | 8/2012 | Andrews et al. | 707/728 |

(Continued)

FOREIGN PATENT DOCUMENTS

| | | |
|---|---|---|
| WO | 2015/100371 A1 | 7/2015 |
| WO | 2015/130127 A1 | 9/2015 |

OTHER PUBLICATIONS

Samsung Gear 2, http://www.samsung.com/us/mobile/wearable-tech, know about as early as Dec. 20, 2013.

(Continued)

*Primary Examiner* — Alexander Eisen
*Assistant Examiner* — Cory Almeida
(74) *Attorney, Agent, or Firm* — Kunzler Law Group

(57) ABSTRACT

For displaying data on a wearable device, a public display wearable on a wrist presents public data. A private display wearable on the wrist presents private data. The private data may include a correspondent identity.

16 Claims, 9 Drawing Sheets

(56) References Cited

U.S. PATENT DOCUMENTS

2013/0222270 A1* 8/2013 Winkler et al. .............. 345/173
2013/0222271 A1 8/2013 Alberth et al.

OTHER PUBLICATIONS

SmartWatch 2 SW2, http://www.sonymobile.com/us/products/accessories/smartwatch-2-sw2, known about as early as Dec. 20, 2013.

\* cited by examiner

WEARABLE DEVICE WITH PUBLIC DISPLAY AND PRIVATE DISPLAY AREAS

FIELD

The subject matter disclosed herein relates to wearable devices and more particularly relates to wearable devices with public display and private display areas.

BACKGROUND

Description of the Related Art

Wearable devices may present conveniently viewable data and information to a wearer. The data and information may also be viewable by nearby observers.

BRIEF SUMMARY

A wearable device with public display and private display areas is disclosed. A public display wearable on a wrist presents public data. A private display wearable on the wrist presents private data. The private data may include a correspondent identity. A method and computer program product also perform the functions of the wearable device.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1A:
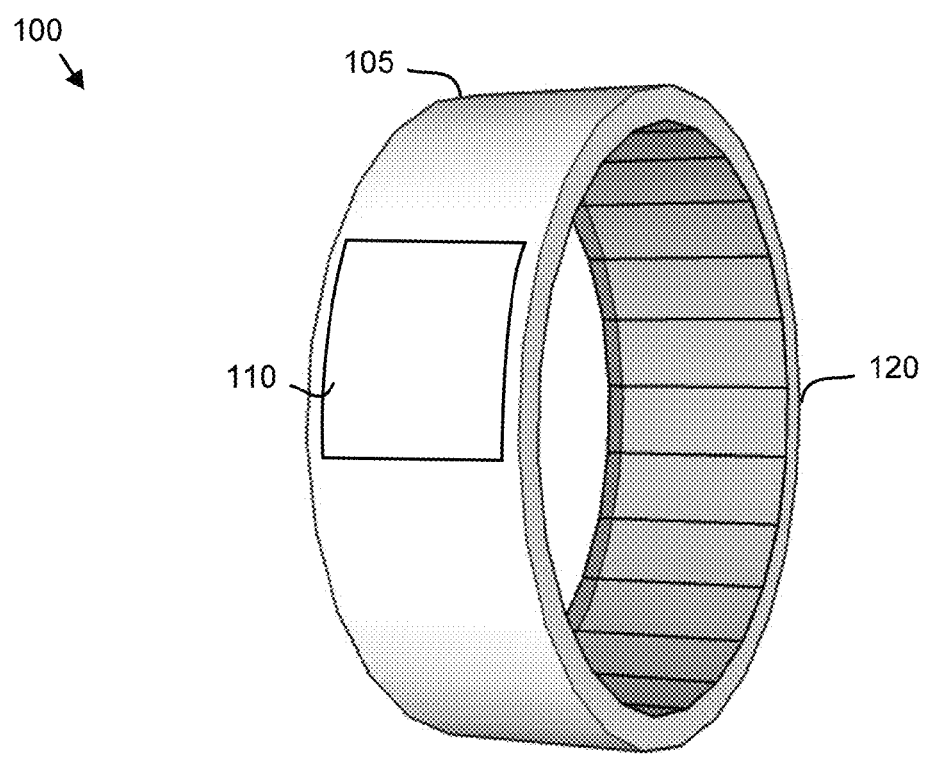
FIG. 1A is a perspective drawing illustrating one embodiment of a wearable device.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages, including an object oriented programming language such as Java, Smalltalk, C++ or the like and conventional procedural programming languages, such as the "C" programming language or similar programming languages. The code may execute entirely on the wearer's computer, partly on the wearer's computer, as a stand-alone software package, partly on the wearer's computer and partly on a remote computer or entirely on the remote computer or server. In the latter scenario, the remote computer may be connected to the wearer's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, wearer selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1A is a perspective drawing illustrating one embodiment of a wearable device 100. In the depicted embodiment, the wearable device 100 is wearable on a wrist. The wearable device 100 may include a band 105 and a public display 110. The band 105 may secure the public display 110 to the wrist.

In the past, wearable devices such as wristwatches typically presented public data such as the time and/or date. As a result, there was little risk in nearby observers seeing the display of the wristwatch. However, the wearable device 100 may present private data such as an identity of a correspondent, referred to hereafter as a correspondent identity, who is communicating with the wearer through mobile telephone connection, an email, messaging, short message service (SMS) texting, and the like or private data such as an incoming call status, a message, a calendar entry, a social media post, a location-based service, a name, and/or an image. Publicly presenting such private data could be undesirable.

The embodiments described herein provide a private display 120 (behind the band 105) that is wearable on the wrist as part of the wearable device 100. The private display 120 may be less readily viewable by nearby observers, protecting the privacy of the private data. The private display 120 may present private data such as a correspondent identity while the public display 110 presents public data such as an operational status as will be described hereafter.

Figure 1B:
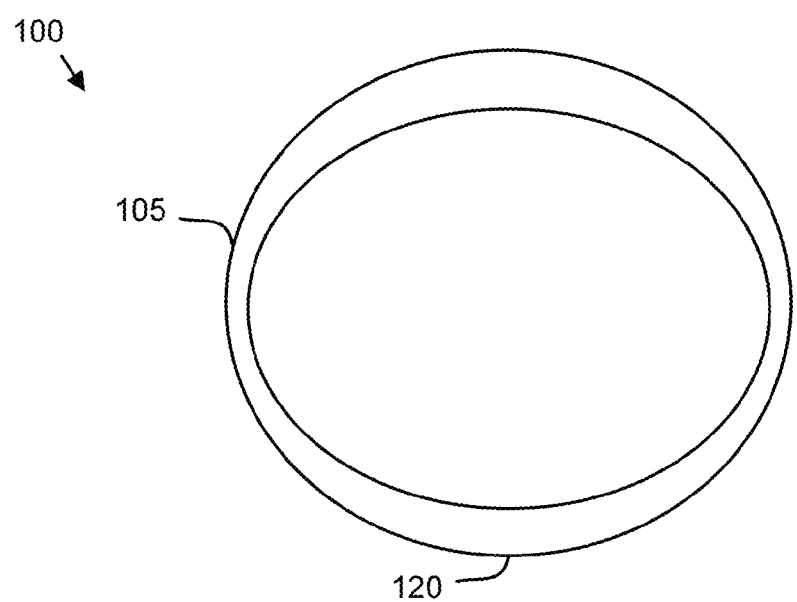
FIG. 1B is a side view drawing illustrating one alternate embodiment of a wearable device.

FIG. 1B is a side view drawing illustrating one alternate embodiment of the wearable device 100. The public display 110 and the band 105 of the wearable device 100 are shown, with the public display 110 disposed on a dorsal portion of the wearable device 100. In addition, the location of the private display 120 is also depicted with the private display 120 disposed on a ventral portion of the wearable device 100.

Figure 1C:
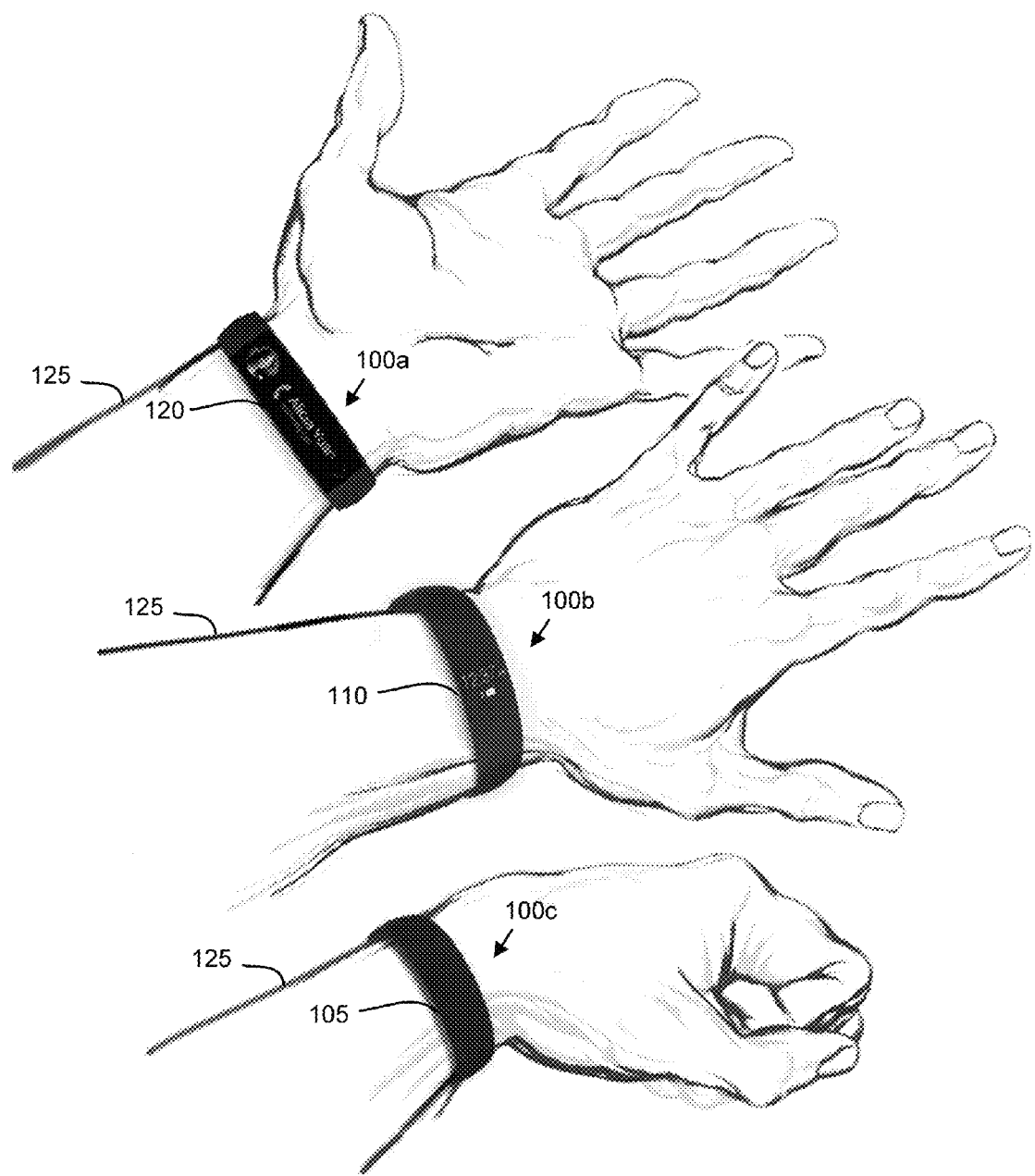
FIG. 1C is drawings illustrating alternate embodiments of wearable devices.

FIG. 1C is drawings illustrating alternate embodiments of wearable devices 100 showing the relative dispositions of the public display 110 and the private display 120. Three embodiments of the wearable device 100 are shown disposed on wrists 125. The private display 120 may be viewable by the wearer while a bottom of the wrist 125 is oriented upward as shown in the top wearable device 100a. The public display 110 may be viewable by the wearer while a top of the wrist 125 is oriented upward as shown in the center wearable device 100b.

However, while the top of the wrist 125 is oriented upward, the private display 120 may not be viewable by most nearby observers. Similarly, while the right side of the wrist 125 is oriented upward, the private display 120 may not also be viewable by most nearby observers.

As a result, the private display 120 is readily viewable by the wearer when desired. However, the private display 120 is not readily viewable by nearby observers. Private data that is presented on the private display 120 is significantly less likely to be viewed by the nearby observers.

Figure 1D:
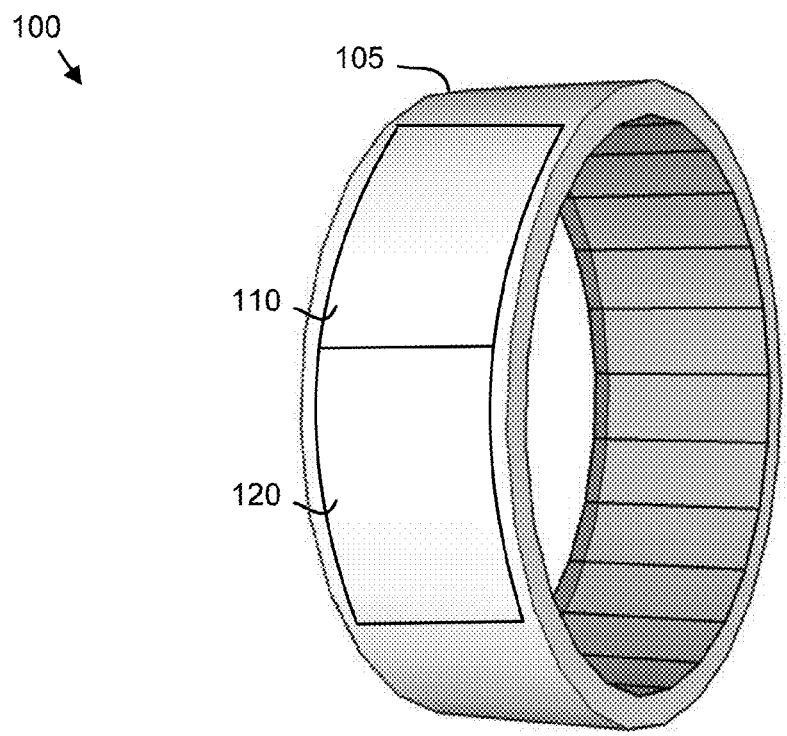
FIG. 1D is a perspective drawing illustrating one alternate embodiment of a wearable device.

FIG. 1D is a perspective drawing illustrating one alternate embodiment of the wearable device 100. The wearable device 100 includes the band 105, the public display 110, and the private display 120. In the depicted embodiment, the public display 110 and the private display 120 are adjacent to each other. In one embodiment, the private display 120 is disposed proximal to the wearer. In an alternate embodiment, the private display 120 is disposed on the band 105 relative to the public display 110 such that when display data is oriented upward, the public display 110 is disposed above the private display 120 as depicted in FIG. 1D.

In one embodiment, the public display 110 and the private display 120 are each discrete displays. Alternatively, the public display 110 and the private display 120 may each be portions of a single display. The wearer may adjust the relative portions of the single display associated with the public display 110 and the private display 120.

Figure 1E:
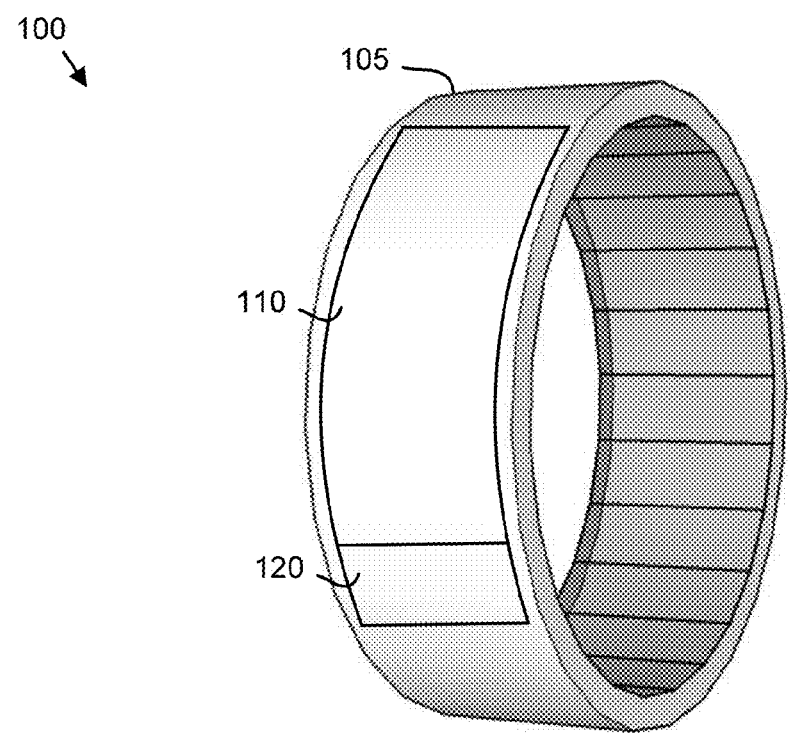
FIG. 1E is a perspective drawing illustrating one alternate embodiment of the wearable device.

FIG. 1E is a perspective drawing illustrating one alternate embodiment of the wearable device 100 of FIG. 1D. In the depicted embodiment, the private display 120 is smaller than the public display 110. The public display 110 and the private display 120 may be discrete displays with different display sizes. Alternatively, the public display 110 and the private display 120 may each be a portion of the single display. In the depicted embodiment, the wearer may have adjusted the private display 120 to be associated with a smaller portion of the single display.

Figure 2A:
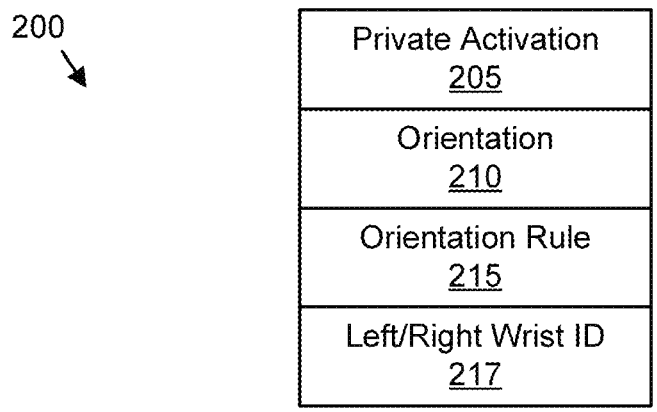
FIG. 2A is a schematic block diagram illustrating one embodiment of private display data.

FIG. 2A is a schematic block diagram illustrating one embodiment of private display data 200. The private display data 200 may be used to determine when and how to present private data on the private display 120. The private display data 200 may be organized in a data structure and stored in a memory. The private display data 200 includes a private activation 205, an orientation 210, an orientation rule 215, and a left/right wrist identifier 217.

The private activation 205 may specify one or more presentation commands that activate presentation of the private data on the private display 120. The presentation commands may include a touch command to the public display 110, a touch command to the private display 120, and/or a voice command. For example, a touch to the private display 120 may activate presentation of the private data on the private display 120.

Alternatively, the wearer may activate presentation of the private data on the private display 120 by speaking a voice commands such as "display." The private activation 205 may further store one or more biometric identifiers for the wearer. For example, the private activation 205 may store a voice print and/or fingerprint for the wearer. The wearer touching the public display 110 and/or private display 120 may activate the display of the private data if the fingerprint of the finger touching the display matches the fingerprint stored for the private activation 205. Similarly, the wearer speaking the command "display" may activate the presentation of the private data if the voice print for the command matches the voice print stored in a private activation 205.

The orientation 210 may describe a current orientation of the private display 120. The orientation may be detected from an orientation measured by the gyroscope. Alternatively, the orientation may be detected from an acceleration measured by an accelerometer. In one embodiment, the orientation indicates an angle of the private display 120 from vertical as will be shown hereafter. Alternatively, the orientation may indicate an angle of the private display 120 relative to a portion of the wearer's anatomy such as the wearer's eyes.

The orientation rule 215 may specify when the private display 120 is in a wearer viewable orientation. In one embodiment, the orientation rule 215 specifies a range of view angles from vertical. The view angles may be in the range of 15 to 60 degrees. Alternatively, the orientation rule 215 may specify a range of view angles relative to the wearer's eyes. The view angles may be in the range of 0 to 45 degrees.

Figure 2B:
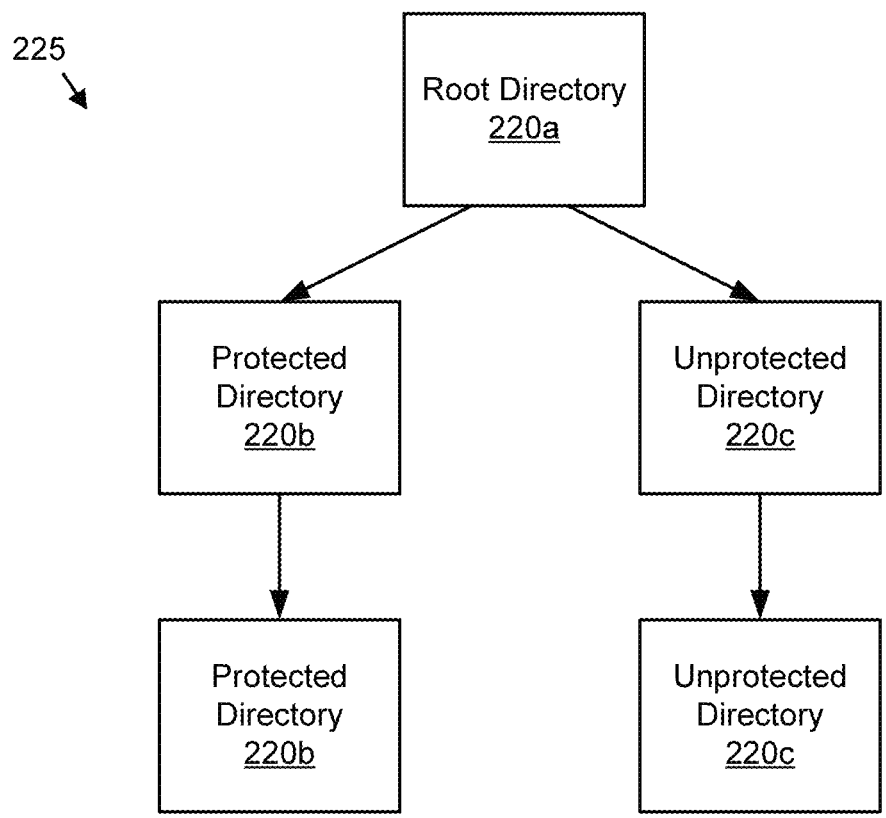
FIG. 2B is a schematic block diagram illustrating one embodiment of a privacy hierarchy.

FIG. 2B is a schematic block diagram illustrating one embodiment of a privacy hierarchy 225. The privacy hierarchy 225 may be embodied in a file system hierarchy. The file system may include a root directory 220a with additional directories 220 depending hierarchically from the root directory 220a. In one embodiment, if the parent directory 220 is a protected directory 220b, child directories 220 may inherit the protected status of the parent directory 220 and also be protected directories 220b. Similarly if a parent directory 220 is an unprotected directory 220c, child directories 220 may inherit the unprotected status of the parent directory 220 and also be unprotected directories 220c. In one embodiment, protected directories 220b exceed a privacy threshold while unprotected directories 220c do not exceed a privacy threshold.

Figures 2C, 2D:
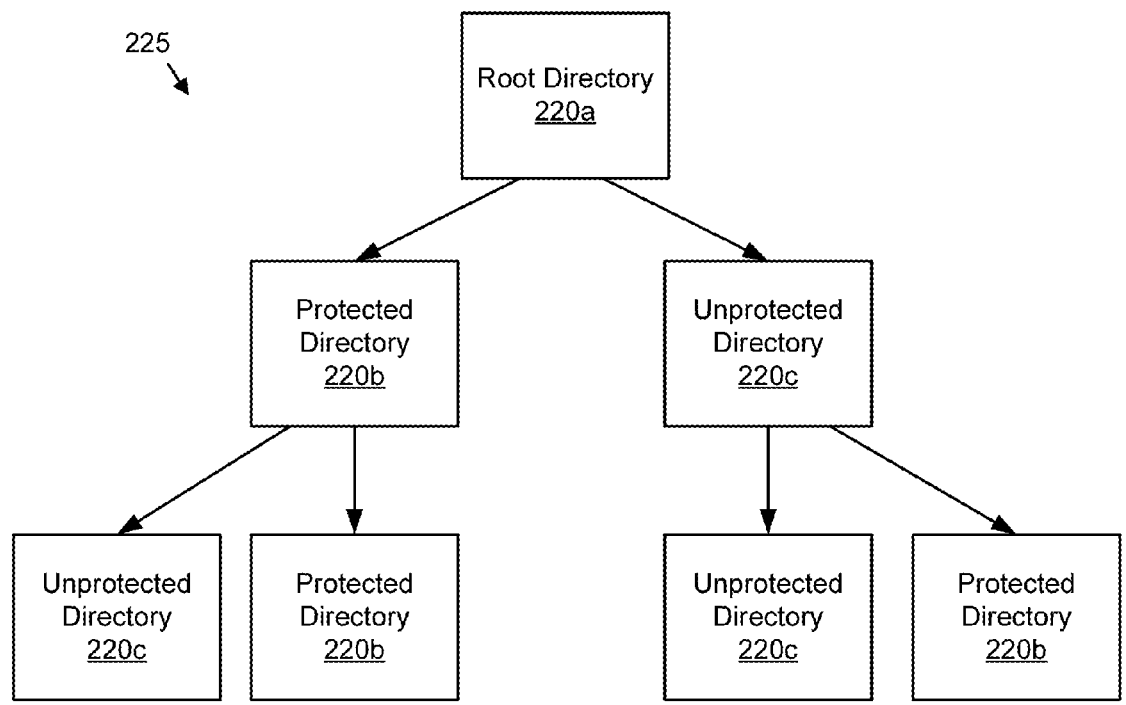
FIG. 2C is a schematic block diagram illustrating one alternate embodiment of a privacy hierarchy.
FIG. 2D is a schematic block diagram illustrating one embodiment of privacy data.

FIG. 2C is a schematic block diagram illustrating one alternate embodiment of the privacy hierarchy 225. As in FIG. 2B, the privacy hierarchy 225 is embodied in a file system hierarchy. However, each directory 220 may be designated as a protected directory 220b or an unprotected directory 220c without inheriting a protected status from a parent directory 220. A metadata flag may indicate whether a directory 220 is a protected directory 220b or an unprotected directory 220c. In one embodiment, protected directories 220b exceed a privacy threshold while unprotected directories 220c do not exceed the privacy threshold.

FIG. 2D is a schematic block diagram illustrating one embodiment of privacy data 230. The privacy data 230 may be organized as data structures and stored in a memory. The privacy data 230 may include a plurality of entries 245. In one embodiment, each data element of the wearable device 100 has an entry 245 in the privacy data 230. Each entry 245 may include a data description 235 and a privacy value 240.

The data description 235 may describe a data element. The data description 235 may be a file system path, an application identifier, an address range in memory, an address identifier, or combinations thereof. The privacy value 240 may describe a level of privacy that the wearer desires for the associated data element. For example, the privacy value 240 may be the numerals 1 to 5. The data element may be private data if the privacy value 240 exceeds the privacy threshold.

In one embodiment, the privacy threshold is a function of one or more of a time, a location, an environment, an action an association of a source of received data, and an importance level of received data. For example, if the source of received data is associated with a high privacy value 240, the received data may have a high privacy value. Alternatively, if the received data has a high importance level, the received data may have a high privacy value 240. In addition, the privacy threshold may be very high when the wearer is it home while the privacy threshold may be very low while the wearer is in a public place. In one embodiment, the privacy threshold is calculated as a sum of privacy threshold values for the current time, location, environment, and action of the wearer. Table 1 lists prophetic privacy threshold values.

TABLE 1

| Situation | Privacy Threshold Value |
|---|---|
| Home Location | 8 |
| Work Location | 6 |
| Public Location | 1 |
| Work Hours Time | 6 |
| After Work Time | 3 |
| Quiet Environment | 6 |
| Noisy Environment | 2 |
| Active Action | 7 |
| Passive Action | 2 |

For example, if the wearer is in a public location after work hours, the environment is noisy, and the action of the wearer is passive, the privacy threshold may be calculated as the sum 1+3+2+2 divided by 10. The environment may be detected by a camera or microphone. The action of the wearer may be detected by an accelerometer.

Figure 3A:
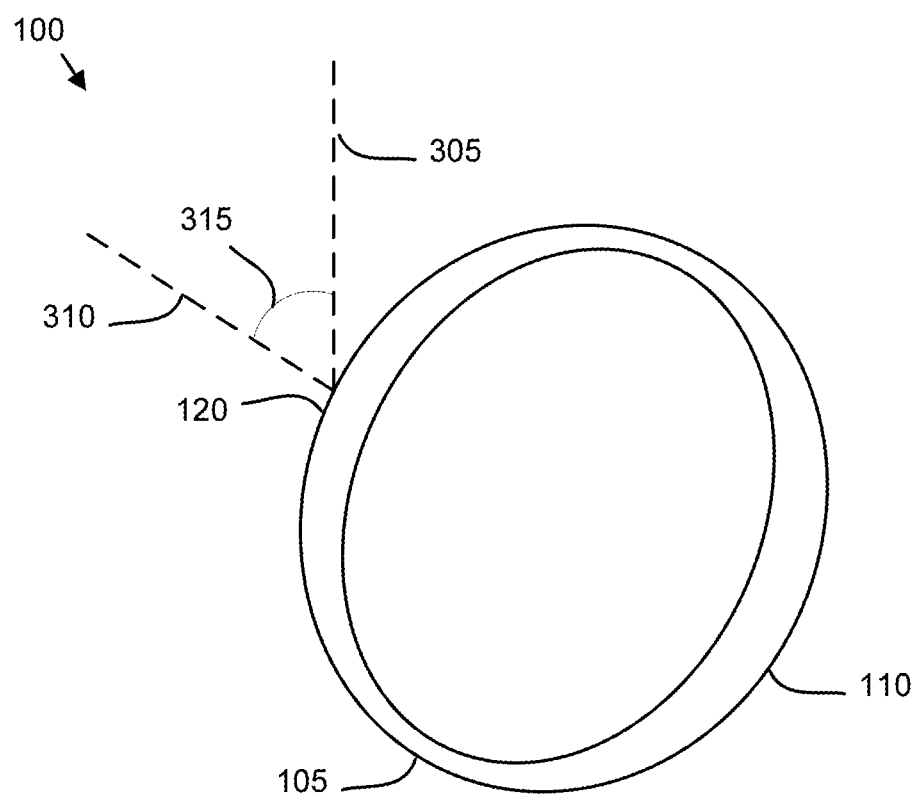
FIG. 3A is a drawing illustrating one embodiment of a wearer viewable orientation.

FIG. 3A is a drawing illustrating one embodiment of a wearer viewable orientation. A side view of the wearable device 100 is shown. In addition, a private display vector 310 is depicted. The private display vector 310 is normal to the private display 120. Alternatively, the private display vector 310 may be normal to a center of the private display 120. The view angle 315 is also shown measured between the private display vector 310 and vertical 305, where vertical 305 is a vertical vector. In one embodiment, the private display 120 is in a wearer viewable orientation if the private display vector 310 is in the range of 15 to 60 degrees from the vertical 305.

Figure 3B:
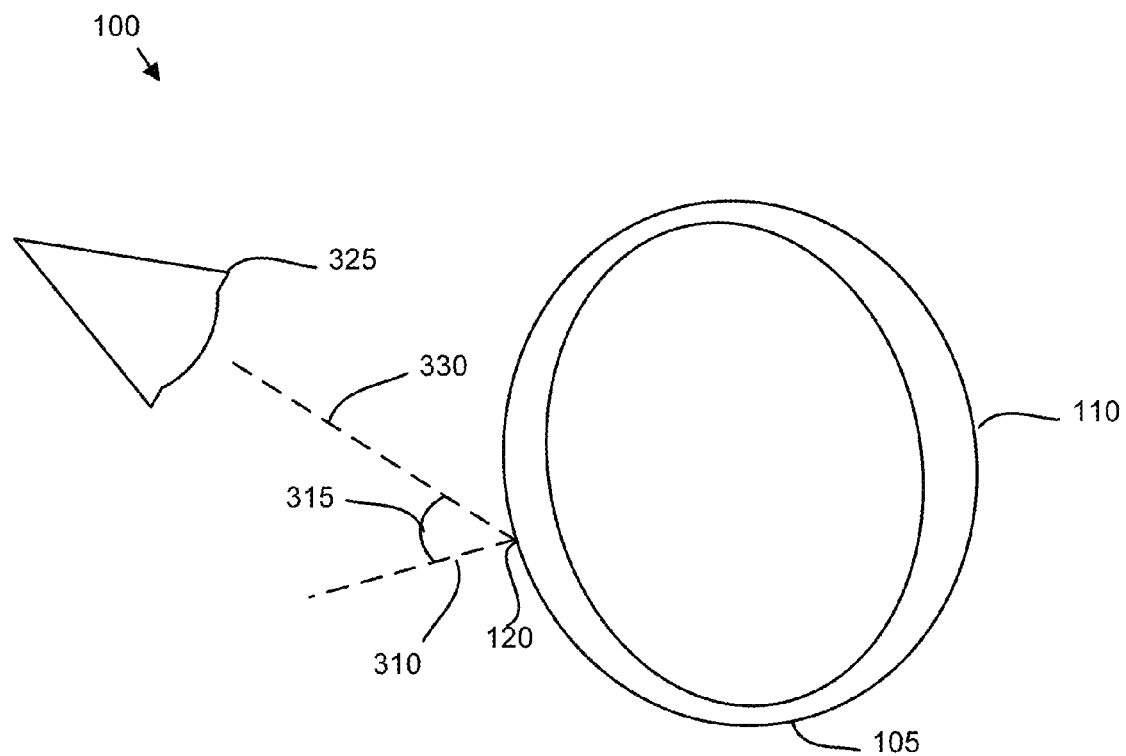
FIG. 3B is a drawing illustrating one alternate embodiment of a wearer viewable orientation.

FIG. 3B is a drawing illustrating one alternate embodiment of a wearer viewable orientation. A side view of the wearable device 100 is shown. The private display vector 310 is depicted normal to the private display 120. A wearer vector 330 is also shown from the private display 120 to the wearer, and in the depicted embodiment, the eyes 325 of the wearer. Alternatively, the wearer vector 330 may be measured to another part of the wearer's anatomy. In one embodiment, a camera embedded in the wearable device 100 determines the location of the eyes 325 or other part of the wearer's anatomy. The view angle 315 may be measured between the private display vector 310 and the wearer vector 330. The private display 120 may be in the wearer viewable orientation if the view angle 315 is in the range of 0 to 45 degrees.

Figure 3C:
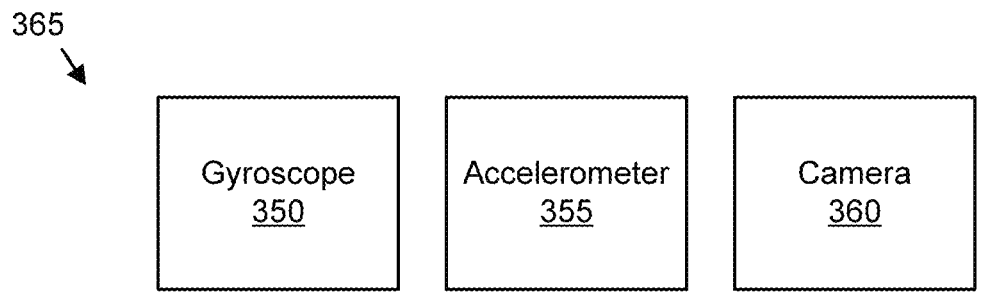
FIG. 3C is a schematic block diagram illustrating one embodiment of orientation measurement devices.

FIG. 3C is a schematic block diagram illustrating one embodiment of orientation measurement devices 365. The orientation measurement devices 365 may include the gyroscope 350, the accelerometer 355, and the camera 360. The gyroscope 350, the accelerometer 355, and the camera 360 may be embodied in the wearable device 100.

Figure 4:
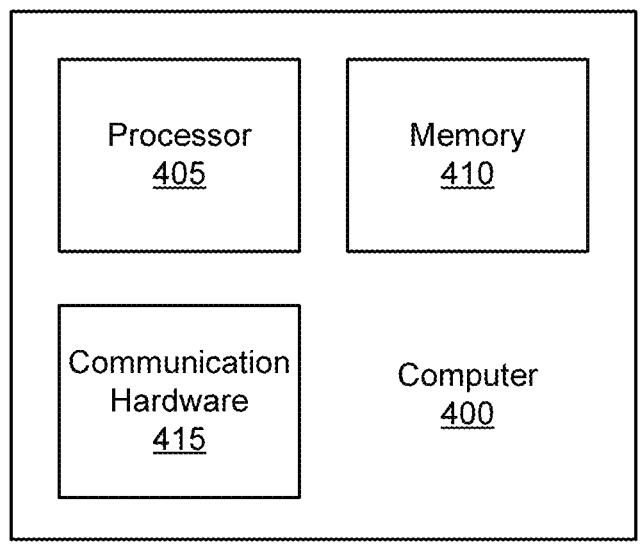
FIG. 4 is a schematic block diagram illustrating one embodiment of a computer.

FIG. 4 is a schematic block diagram illustrating one embodiment of a computer 400. The computer 400 may be embodied in the wearable device 100. The computer 400 includes a processor 405, a memory 410, and communication hardware 415. The memory 410 may be a semiconductor storage device. Alternatively, the memory 410 may also include a hard disk drive, a micromechanical storage device, an optical storage device, or combinations thereof. The memory 410 may store code. The processor 405 may execute the code. The communication hardware 415 may communicate with other devices such as the gyroscope 350, the accelerometer 355, and/or the camera 360. In addition, the communication hardware 415 may communicate with one or more networks.

Figure 5:
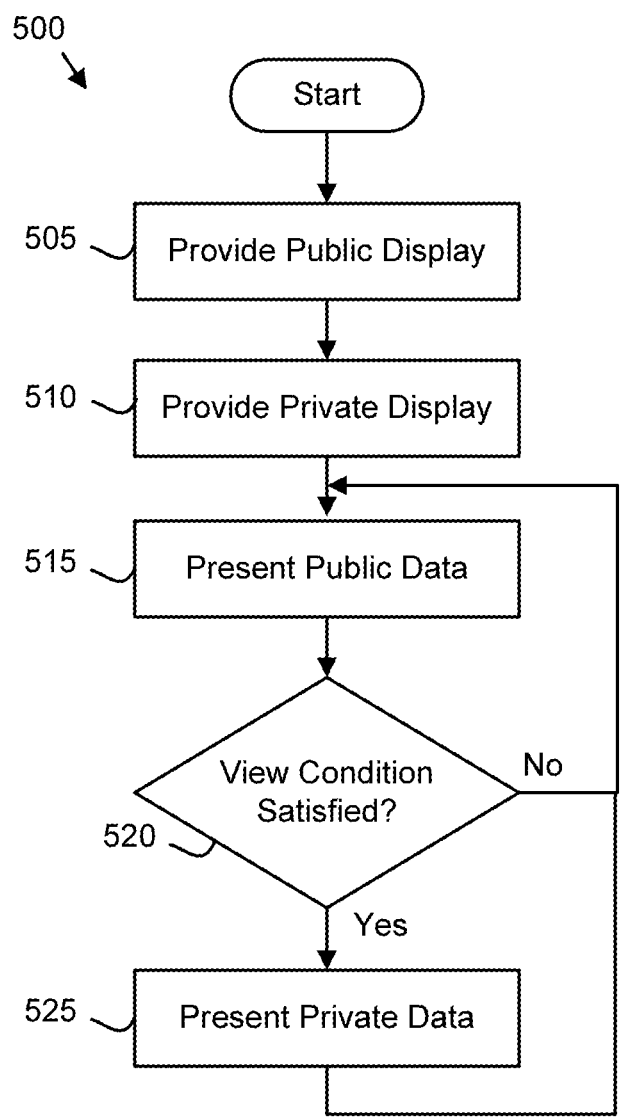
FIG. 5 is a schematic flow chart diagram illustrating one embodiment of a private data presentation method.

FIG. 5 is a schematic flow chart diagram illustrating one embodiment of a private data presentation method 500. The method 500 may present private data on the private display 120 of the wearable device 100. The method 500 may perform the functions of the wearable device 100. In one embodiment, the method 500 is performed in part by a program product comprising a computer readable storage medium such as the memory 410 that stores code executable by the processor 405. Alternatively, the method 500 may be performed in part by the processor 405.

The method 500 starts, and in one embodiment, the wearable device 100 provides 505 the public display 110. The public display 110 may be disposed on a dorsal portion of the wearable device 100. In addition, the wearable device provides 110 the private display 120.

The private display 110 may be disposed on a ventral portion of the wearable device 100. Alternatively, the private display 120 may be adjacent to the public display 110. In one embodiment, the public display 110 and the private display 120 are each portions of the single display.

The public display 110 may present 515 the public data. In addition, the wearable device 100 may determine 520 if a view condition is satisfied. In one embodiment, the view condition is satisfied in response to the wearable device 100 receiving a presentation command. The wearer may specify the presentation command and the specified presentation command may be stored in the private activation 205. Alternatively, the wearer may select one or more presentation commands stored in the private activation 205.

In one embodiment, the view condition is satisfied in response to detecting the private display 120 in the wearer viewable orientation. In one embodiment, the wearer viewable orientation is in the range of 15 to 60 degrees from the vertical 305. For example, the private display 120 may be in the wearer viewable orientation if the private display vector 310 is in the range of 15 to 60 degrees from the vertical 305. Alternatively, the wearer viewable orientation may be in the range of 0 to 45 degrees of the wearer vector 330. For example, the private display 120 may be in the wearer viewable orientation if the private display vector 310 is within 0 to 45 degrees of the wearer vector 330.

If the view condition is not satisfied, the public display 110 may continue to present 515 the public data. If the view condition is satisfied, the private display 120 may present 525 the private data.

The embodiments provide a public display 110 and a private display 120 for the wearable device. The public display 110 presents public data while the private display 120 presents private data. The disposition of the private display 120 results in the private display 120 being more difficult to view by nearby observers. In addition, the private data may only be presented on the private display 120 when a view condition is satisfied. As a result, the wearable device's private data is protected from being seen by nearby observers. The private data may include a correspondent identity. In addition, the private data may be identified as data in a privacy hierarchy 225 that exceeds a privacy threshold. Alternatively, the privacy data may be identified as data with a privacy value 240 that exceeds a privacy threshold.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A wearable device comprising:
   a public display wearable on a wrist that presents data in response to a privacy value not exceeding a privacy threshold, wherein the data comprises a correspondent identity and privacy data comprising a data description and the privacy value, the data description comprises an application identifier and a source of the data, the privacy value is a function the source of the data, and the privacy threshold is a function of a location of the wearable device comprising one of a home location, a work location, and a public location, a time comprising a work hours time and an after work hours time, an environment comprising a quiet environment and a noisy environment, and an action comprising an active action and a passive action;
   a private display wearable on the wrist that presents the data in response to the privacy value exceeding the privacy threshold; and
   wherein given data with a given privacy threshold is presented on the public display in response to one or more of the home location, the after work hours, the quiet environment, and the active action, and the given data is presented on the private display in response to one of the public location, the work hours time, the noisy environment, and the passive action.

2. The wearable device of claim 1, wherein the public display is disposed on a dorsal portion of the wearable device and the private display is disposed on a ventral portion of the wearable device.

3. The wearable device of claim 1, wherein the public display and the private display are adjacent and the private display is disposed proximal to a wearer.

4. The wearable device of claim 3, wherein the public display and the private display are each portions of a single display.

5. The wearable device of claim 1, wherein the privacy threshold is further a function of an importance level of received data.

6. The wearable device of claim 1, wherein the private display further presents the data in response to detecting the private display in a wearer viewable orientation.

7. The wearable device of claim 6, wherein the wearer viewable orientation is detected from an orientation measured by a gyroscope.

8. The wearable device of claim 6, wherein the wearer viewable orientation is detected from an acceleration measured by an accelerometer.

9. The wearable device of claim 6, wherein the wearer viewable orientation is in the range of 15 to 60 degrees from vertical.

10. The wearable device of claim 1, wherein the private display further presents the data in response to one of a touch command to the public display, a touch command to the private display, and a voice command.

11. The wearable device of claim 1, wherein the privacy value exceeds the privacy threshold in response to comprising one or more of incoming call status, a message, a calendar entry, a social media post, a location based service, a name, and an image.

12. A method comprising:
    presenting data on a public display wearable on a wrist in response to a privacy value not exceeding a privacy threshold, wherein the data comprises a correspondent identity and privacy data comprising a data description and the privacy value, the data description comprises an application identifier and a source of the data, the privacy value is a function the source of the data, and the privacy threshold is a function of a location of the wearable device comprising one of a home location, a work location, and a public location, a time comprising a work hours time and an after work hours time, an environment comprising a quiet environment and a noisy environment, and an action comprising an active action and a passive action;
    presenting the data on a private display wearable on the wrist in response to the privacy value exceeding the privacy threshold; and
    wherein given data with a given privacy threshold is presented on the public display in response to one or more of the home location, the after work hours, the quiet environment, and the active action, and the given data is presented on the private display in response to one of the public location, the work hours time, the noisy environment, and the passive action.

13. The method of claim 12, wherein the private display further presents the data in response to detecting the private display in a wearer viewable orientation.

14. A program product comprising a computer readable storage medium that stores code executable by a processor to perform:
    presenting data on a public display wearable on a wrist in response to a privacy value not exceeding a privacy threshold, wherein the data comprises a correspondent identity and privacy data comprising a data description and the privacy value, the data description comprises an application identifier and a source of the data, the privacy value is a function the source of the data, and the privacy threshold is a function of a location of the wearable device comprising one of a home location, a work location, and a public location, a time comprising a work hours time and an after work hours time, an environment comprising a quiet environment and a noisy environment, and an action comprising an active action and a passive action;

presenting the data on a private display wearable on the wrist in response to the privacy value exceeding the privacy threshold; and wherein given data with a given privacy threshold is presented on the public display in response to one or more of the home location, the after work hours, the quiet environment, and the active action, and the given data is presented on the private display in response to one of the public location, the work hours time, the noisy environment, and the passive action.

15. The method of claim 14, wherein the private display further presents the data in response to detecting the private display in a wearer viewable orientation.

16. A wearable device comprising:
an orientation sensor;
a public display wearable on a wrist that presents data in response to a privacy value not exceeding a privacy threshold, wherein the data comprises a correspondent identity and privacy data comprising a data description and the privacy value, the data description comprises an application identifier and a source of the data, the privacy value is a function the source of the data, and the privacy threshold is a function of a location of the wearable device;
a private display wearable on the wrist that presents the data in response to the orientation sensor detecting a wearer viewable orientation and the privacy value exceeding the privacy threshold; and
wherein given data with a given privacy threshold is presented on the public display in response to one or more of the home location, the after work hours, the quiet environment, and the active action, and the given data is presented on the private display in response to one of the public location, the work hours time, the noisy environment, and the passive action.

* * * * *